United States Patent
Lindhé et al.

(10) Patent No.: US 10,433,697 B2
(45) Date of Patent: Oct. 8, 2019

(54) ADAPTIVE SPEED CONTROL OF ROTATING SIDE BRUSH

(71) Applicant: Aktiebolaget Electrolux, Stockholm (SE)

(72) Inventors: Magnus Lindhé, Stockholm (SE);
Andreas Klintemyr, Stockholm (SE);
Anders Haegermarck, Trångsund (SE);
Petter Forsberg, Stockholm (SE)

(73) Assignee: Aktiebolaget Electrolux (SE)

(*) Notice: Subject to any disclaimer, the term of this patent is extended or adjusted under 35 U.S.C. 154(b) by 303 days.

(21) Appl. No.: 15/101,510

(22) PCT Filed: Dec. 19, 2013

(86) PCT No.: PCT/EP2013/077385
§ 371 (c)(1),
(2) Date: Jun. 3, 2016

(87) PCT Pub. No.: WO2015/090403
PCT Pub. Date: Jun. 25, 2015

(65) Prior Publication Data
US 2016/0309975 A1    Oct. 27, 2016

(51) Int. Cl.
*A47L 9/28* (2006.01)
*A47L 11/40* (2006.01)
(Continued)

(52) U.S. Cl.
CPC ......... *A47L 11/4066* (2013.01); *A47L 9/2805* (2013.01); *A47L 9/2852* (2013.01);
(Continued)

(58) Field of Classification Search
None
See application file for complete search history.

(56) References Cited

U.S. PATENT DOCUMENTS

| 1,286,321 A | 12/1918 | Hoover |
| 1,401,007 A | 12/1921 | Staples |

(Continued)

FOREIGN PATENT DOCUMENTS

| CA | 2154758 | 6/1995 |
| CN | 1116818 | 2/1996 |

(Continued)

OTHER PUBLICATIONS

Machine Translation of JP2007-143645 by Mitani et al., published Jun. 14, 2007.*

(Continued)

*Primary Examiner* — Nicole Blan
*Assistant Examiner* — Ryan L. Coleman
(74) *Attorney, Agent, or Firm* — RatnerPrestia

(57) ABSTRACT

A method of controlling rotating side brushes of a robotic cleaning device and a robotic cleaning device performing the method. The robotic cleaning device has a main body, a propulsion system arranged to move the robotic cleaning device across a surface to be cleaned, and a controller arranged to control the propulsion system to move the robotic cleaning device across the surface to be cleaned in accordance with navigation information. The robotic cleaning device has an opening arranged in a bottom side of the main body via which debris is removed from the surface to be cleaned, and at least one rotating side brush adjacent to the opening. The controller registers a speed with which the robotic cleaning device moves across the surface to be cleaned, and controls a rotational speed of the rotating side brush on the basis of the registered speed of movement of the robotic cleaning device.

11 Claims, 6 Drawing Sheets

(51) Int. Cl.
*A47L 11/24* (2006.01)
*G05D 1/02* (2006.01)
(52) U.S. Cl.
CPC .......... *A47L 11/24* (2013.01); *A47L 11/4011* (2013.01); *A47L 11/4038* (2013.01); *A47L 11/4041* (2013.01); *A47L 11/4069* (2013.01); *G05D 1/0219* (2013.01); *A47L 2201/04* (2013.01); *A47L 2201/06* (2013.01); *Y02B 40/82* (2013.01)

(56) References Cited

U.S. PATENT DOCUMENTS

| | | |
|---|---|---|
| 1,823,128 A | 9/1931 | Scott |
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |

(56) References Cited

U.S. PATENT DOCUMENTS

| | | |
|---|---|---|
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |

(56) References Cited

U.S. PATENT DOCUMENTS

| | | | |
|---|---|---|---|
| 7,424,766 | B2 | 9/2008 | Reindle |
| 7,429,843 | B2 | 9/2008 | Jones |
| 7,430,455 | B2 | 9/2008 | Casey |
| 7,438,766 | B2 | 10/2008 | Song |
| 7,441,298 | B2 | 10/2008 | Svendsen |
| 7,444,206 | B2 | 10/2008 | Abramson |
| 7,448,113 | B2 | 11/2008 | Jones |
| 7,459,871 | B2 | 12/2008 | Landry |
| 7,464,157 | B2 | 12/2008 | Okude |
| 7,474,941 | B2 | 1/2009 | Kim |
| 7,480,958 | B2 | 1/2009 | Song |
| 7,480,960 | B2 | 1/2009 | Kim |
| D586,959 | S | 2/2009 | Geringer |
| 7,489,277 | B2 | 2/2009 | Sung |
| 7,489,985 | B2 | 2/2009 | Ko |
| 7,499,774 | B2 | 3/2009 | Barrett |
| 7,499,775 | B2 | 3/2009 | Filippov |
| 7,499,776 | B2 | 3/2009 | Allard |
| 7,499,804 | B2 | 3/2009 | Svendsen |
| 7,503,096 | B2 | 3/2009 | Lin |
| 7,515,991 | B2 | 4/2009 | Egawa |
| D593,265 | S | 5/2009 | Carr |
| 7,539,557 | B2 | 5/2009 | Yamauchi |
| 7,546,891 | B2 | 6/2009 | Won |
| 7,546,912 | B1 | 6/2009 | Pack |
| 7,555,363 | B2 | 6/2009 | Augenbraun |
| 7,556,108 | B2 | 7/2009 | Won |
| 7,559,269 | B2 | 7/2009 | Rudakevych |
| 7,564,571 | B2 | 7/2009 | Karabassi |
| 7,566,839 | B2 | 7/2009 | Hukuba |
| 7,567,052 | B2 | 7/2009 | Jones |
| 7,568,259 | B2 | 8/2009 | Yan |
| 7,568,536 | B2 | 8/2009 | Yu |
| 7,571,511 | B2 | 8/2009 | Jones |
| 7,573,403 | B2 | 8/2009 | Goncalves |
| 7,574,282 | B2 | 8/2009 | Petersson |
| 7,578,020 | B2 | 8/2009 | Jaworski |
| 7,579,803 | B2 | 8/2009 | Jones |
| 7,581,282 | B2 | 9/2009 | Woo |
| 7,597,162 | B2 | 10/2009 | Won |
| 7,600,521 | B2 | 10/2009 | Woo |
| 7,600,593 | B2 | 10/2009 | Filippov |
| 7,603,744 | B2 | 10/2009 | Reindle |
| 7,604,675 | B2 | 10/2009 | Makarov |
| 7,610,651 | B2 | 11/2009 | Baek |
| 7,613,543 | B2 | 11/2009 | Petersson |
| 7,620,476 | B2 | 11/2009 | Morse |
| 7,636,982 | B2 | 12/2009 | Jones |
| 7,647,144 | B2 | 1/2010 | Haegermarck |
| 7,650,666 | B2 | 1/2010 | Jang |
| 7,654,348 | B2 | 2/2010 | Ohm |
| 7,660,650 | B2 | 2/2010 | Kawagoe |
| 7,663,333 | B2 | 2/2010 | Jones |
| 7,673,367 | B2 | 3/2010 | Kim |
| 7,679,532 | B2 | 3/2010 | Karlsson |
| 7,688,676 | B2 | 3/2010 | Chiappetta |
| 7,693,654 | B1 | 4/2010 | Dietsch |
| 7,697,141 | B2 | 4/2010 | Jones |
| 7,706,917 | B1 | 4/2010 | Chiappetta |
| 7,706,921 | B2 | 4/2010 | Jung |
| 7,709,497 | B2 | 5/2010 | Christensen, IV |
| 7,711,450 | B2 | 5/2010 | Im |
| 7,720,572 | B2 | 5/2010 | Ziegler |
| 7,721,829 | B2 | 5/2010 | Lee |
| 7,729,801 | B2 | 6/2010 | Abramson |
| 7,749,294 | B2 | 7/2010 | Oh |
| 7,751,940 | B2 | 7/2010 | Lee |
| 7,761,954 | B2 | 7/2010 | Ziegler |
| 7,765,635 | B2 | 8/2010 | Park |
| 7,765,638 | B2 | 8/2010 | Pineschi et al. |
| 7,769,490 | B2 | 8/2010 | Abramson |
| 7,774,158 | B2 | 8/2010 | Domingues Goncalves |
| 7,779,504 | B2 | 8/2010 | Lee |
| 7,780,796 | B2 | 8/2010 | Shim |
| 7,784,139 | B2 | 8/2010 | Sawalski |
| 7,784,570 | B2 | 8/2010 | Couture |
| 7,785,544 | B2 | 8/2010 | Alward |
| 7,787,991 | B2 | 8/2010 | Jeung |
| 7,793,614 | B2 | 9/2010 | Ericsson |
| 7,801,645 | B2 | 9/2010 | Taylor |
| 7,805,220 | B2 | 9/2010 | Taylor |
| 7,827,653 | B1 | 11/2010 | Liu |
| 7,832,048 | B2 | 11/2010 | Harwig |
| 7,835,529 | B2 | 11/2010 | Hernandez |
| 7,843,431 | B2 | 11/2010 | Robbins |
| 7,844,364 | B2 | 11/2010 | McLurkin |
| 7,849,555 | B2 | 12/2010 | Hahm |
| 7,856,291 | B2 | 12/2010 | Jung |
| 7,860,608 | B2 | 12/2010 | Lee |
| 7,861,365 | B2 | 1/2011 | Sun |
| 7,861,366 | B2 | 1/2011 | Hahm |
| 7,873,437 | B2 | 1/2011 | Aldred |
| 7,877,166 | B2 | 1/2011 | Harwig |
| 7,886,399 | B2 | 2/2011 | Dayton |
| 7,890,210 | B2 | 2/2011 | Choi |
| 7,891,045 | B2 | 2/2011 | Kim |
| 7,891,289 | B2 | 2/2011 | Day |
| 7,891,446 | B2 | 2/2011 | Couture |
| 7,894,951 | B2 | 2/2011 | Norris |
| 7,916,931 | B2 | 3/2011 | Lee |
| 7,920,941 | B2 | 4/2011 | Park |
| 7,921,506 | B2 | 4/2011 | Baek |
| 7,926,598 | B2 | 4/2011 | Rudakevych |
| 7,934,571 | B2 | 5/2011 | Chiu |
| 7,937,800 | B2 | 5/2011 | Yan |
| 7,942,107 | B2 | 5/2011 | Vosburgh |
| 7,957,837 | B2 | 6/2011 | Ziegler |
| 7,962,997 | B2 | 6/2011 | Chung |
| 7,966,339 | B2 | 6/2011 | Kim |
| 7,975,790 | B2 | 7/2011 | Kim |
| 7,979,175 | B2 | 7/2011 | Allard |
| 7,979,945 | B2 | 7/2011 | Dayton |
| 7,981,455 | B2 | 7/2011 | Sus |
| 7,997,118 | B2 | 8/2011 | Mecca |
| 8,001,651 | B2 | 8/2011 | Chang |
| 8,007,221 | B1 | 8/2011 | More |
| 8,010,229 | B2 | 8/2011 | Kim |
| 8,019,223 | B2 | 9/2011 | Hudson |
| 8,020,657 | B2 | 9/2011 | Allard |
| 8,032,978 | B2 | 10/2011 | Haegermarck |
| 8,034,390 | B2 | 10/2011 | Sus |
| 8,042,663 | B1 | 10/2011 | Pack |
| 8,046,103 | B2 | 10/2011 | Abramson |
| 8,061,461 | B2 | 11/2011 | Couture |
| 8,065,778 | B2 | 11/2011 | Kim |
| 8,073,439 | B2 | 12/2011 | Stromberg |
| 8,074,752 | B2 | 12/2011 | Rudakevych |
| 8,078,338 | B2 | 12/2011 | Pack |
| 8,079,432 | B2 | 12/2011 | Ohm |
| 8,082,836 | B2 | 12/2011 | More |
| 8,086,419 | B2 | 12/2011 | Goncalves |
| 8,087,117 | B2 | 1/2012 | Kapoor |
| 8,095,238 | B2 | 1/2012 | Jones |
| 8,095,336 | B2 | 1/2012 | Goncalves |
| 8,107,318 | B2 | 1/2012 | Chiappetta |
| 8,108,092 | B2 | 1/2012 | Phillips |
| 8,109,191 | B1 | 2/2012 | Rudakevych |
| 8,112,942 | B2 | 2/2012 | Bohm |
| 8,113,304 | B2 | 2/2012 | Won |
| 8,122,982 | B2 | 2/2012 | Morey |
| 8,127,396 | B2 | 3/2012 | Mangiardi |
| 8,127,399 | B2 | 3/2012 | Dilger |
| 8,127,704 | B2 | 3/2012 | Vosburgh |
| 8,136,200 | B2 | 3/2012 | Splinter |
| 8,150,650 | B2 | 4/2012 | Goncalves |
| D659,311 | S | 5/2012 | Geringer |
| 8,166,904 | B2 | 5/2012 | Israel |
| 8,195,333 | B2 | 6/2012 | Ziegler |
| 8,196,251 | B2 | 6/2012 | Lynch |
| 8,199,109 | B2 | 6/2012 | Robbins |
| 8,200,600 | B2 | 6/2012 | Rosenstein |
| 8,200,700 | B2 | 6/2012 | Moore |
| 8,237,389 | B2 | 8/2012 | Fitch |
| 8,237,920 | B2 | 8/2012 | Jones |

(56) References Cited

U.S. PATENT DOCUMENTS

| | | |
|---|---|---|
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 9,687,132 B2 | 6/2017 | Schlischka |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |

(56) References Cited

U.S. PATENT DOCUMENTS

| | | |
|---|---|---|
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |

(56) References Cited

U.S. PATENT DOCUMENTS

| | | |
|---|---|---|
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |

(56) References Cited

U.S. PATENT DOCUMENTS

| | | | |
|---|---|---|---|
| 2013/0174371 A1 | 7/2013 | Jones | |
| 2013/0204463 A1 | 8/2013 | Chiappetta | |
| 2013/0204465 A1 | 8/2013 | Phillips | |
| 2013/0204483 A1 | 8/2013 | Sung | |
| 2013/0205520 A1 | 8/2013 | Kapoor | |
| 2013/0206170 A1 | 8/2013 | Svendsen | |
| 2013/0206177 A1 | 8/2013 | Burlutskiy | |
| 2013/0211589 A1 | 8/2013 | Landry | |
| 2013/0214498 A1 | 8/2013 | DeFazio | |
| 2013/0226344 A1 | 8/2013 | Wong | |
| 2013/0227801 A1 | 9/2013 | Kim | |
| 2013/0227812 A1 | 9/2013 | Kim | |
| 2013/0228198 A1 | 9/2013 | Hung et al. | |
| 2013/0228199 A1 | 9/2013 | Hung | |
| 2013/0231779 A1 | 9/2013 | Purkayastha | |
| 2013/0231819 A1 | 9/2013 | Hung | |
| 2013/0232702 A1 | 9/2013 | Baek | |
| 2013/0239870 A1 | 9/2013 | Hudson | |
| 2013/0241217 A1 | 9/2013 | Hickey | |
| 2013/0253701 A1 | 9/2013 | Halloran | |
| 2013/0256042 A1 | 10/2013 | Rudakevych | |
| 2013/0268118 A1 | 10/2013 | Grinstead | |
| 2013/0269148 A1 | 10/2013 | Chiu | |
| 2013/0273252 A1 | 10/2013 | Miyamoto | |
| 2013/0298350 A1 | 11/2013 | Schnittman | |
| 2013/0310978 A1 | 11/2013 | Ozick | |
| 2013/0325178 A1 | 12/2013 | Jones | |
| 2013/0331987 A1 | 12/2013 | Karlsson | |
| 2013/0338525 A1 | 12/2013 | Allen | |
| 2013/0338828 A1 | 12/2013 | Chiappetta | |
| 2013/0338831 A1 | 12/2013 | Noh et al. | |
| 2013/0340201 A1 | 12/2013 | Jang et al. | |
| 2014/0016469 A1 | 1/2014 | Ho | |
| 2014/0026339 A1 | 1/2014 | Konandreas | |
| 2014/0053351 A1 | 2/2014 | Kapoor | |
| 2014/0109339 A1 | 4/2014 | Won | |
| 2014/0123325 A1 | 5/2014 | Jung | |
| 2014/0130272 A1 | 5/2014 | Won | |
| 2014/0142757 A1 | 5/2014 | Ziegler | |
| 2014/0167931 A1 | 6/2014 | Lee | |
| 2014/0180968 A1 | 6/2014 | Song | |
| 2014/0207280 A1 | 7/2014 | Duffley | |
| 2014/0207281 A1 | 7/2014 | Angle | |
| 2014/0207282 A1 | 7/2014 | Angle | |
| 2014/0238440 A1 | 8/2014 | Dayton | |
| 2014/0249671 A1 | 9/2014 | Halloran | |
| 2014/0283326 A1 | 9/2014 | Song | |
| 2015/0005937 A1 | 1/2015 | Ponulak | |
| 2015/0032259 A1 | 1/2015 | Kim et al. | |
| 2015/0033488 A1 | 2/2015 | Varila | |
| 2015/0039127 A1 | 2/2015 | Matsumoto | |
| 2015/0057800 A1 | 2/2015 | Cohen | |
| 2015/0120056 A1 | 4/2015 | Noh et al. | |
| 2015/0197012 A1 | 7/2015 | Schnittman | |
| 2015/0206015 A1 | 7/2015 | Ramalingam et al. | |
| 2015/0265122 A1 | 9/2015 | Han et al. | |
| 2016/0306359 A1 | 10/2016 | Lindhe | |
| 2016/0316982 A1 | 11/2016 | Kim et al. | |
| 2017/0273521 A1 | 9/2017 | Klintemyr et al. | |
| 2017/0273524 A1 | 9/2017 | Klintemyr et al. | |
| 2018/0103812 A1 | 4/2018 | Lee et al. | |

FOREIGN PATENT DOCUMENTS

| | | | |
|---|---|---|---|
| CN | 1668238 A | 9/2005 | |
| CN | 101161174 A | 4/2008 | |
| CN | 101297267 A | 10/2008 | |
| CN | 102083352 A | 6/2011 | |
| CN | 103027634 | 4/2013 | |
| CN | 103054516 A | 4/2013 | |
| CN | 103491838 A | 1/2014 | |
| CN | 103565373 A | 2/2014 | |
| DE | 3536907 | 4/1986 | |
| DE | 9307500 | 7/1993 | |
| DE | 4211789 | 10/1993 | |
| DE | 4340367 | 6/1995 | |
| DE | 4439427 A1 | 5/1996 | |
| DE | 19849978 | 5/2000 | |
| DE | 202008017137 U1 | 3/2009 | |
| DE | 102010000174 | 7/2011 | |
| DE | 102010000573 | 9/2011 | |
| DE | 102010037672 | 3/2012 | |
| EP | 0142594 | 5/1985 | |
| EP | 0358628 | 3/1990 | |
| EP | 0474542 | 3/1992 | |
| EP | 0569984 | 11/1993 | |
| EP | 0606173 | 7/1994 | |
| EP | 1099143 | 11/2003 | |
| EP | 1360922 A2 | 11/2003 | |
| EP | 1441271 | 7/2004 | |
| EP | 1331537 | 8/2005 | |
| EP | 2050380 | 4/2009 | |
| EP | 1969438 | 9/2009 | |
| EP | 1395888 | 5/2011 | |
| EP | 2316322 | 5/2011 | |
| EP | 2296005 | 6/2011 | |
| EP | 2251757 | 11/2011 | |
| EP | 2417894 | 2/2012 | |
| EP | 2438843 | 4/2012 | |
| EP | 2466411 A2 | 6/2012 | |
| EP | 2561787 | 2/2013 | |
| EP | 2578125 | 4/2013 | |
| EP | 2583609 | 4/2013 | |
| EP | 2604163 | 6/2013 | |
| EP | 2447800 | 4/2014 | |
| EP | 2741483 | 6/2014 | |
| EP | 2772815 | 9/2014 | |
| EP | 2884364 A1 | 6/2015 | |
| EP | 2992803 A1 | 3/2016 | |
| FR | 2999410 | 6/2014 | |
| GB | 2355523 | 4/2001 | |
| GB | 2382251 | 5/2003 | |
| GB | 2494446 | 3/2013 | |
| GB | 1447943 | 10/2013 | |
| JP | 5540959 | 3/1980 | |
| JP | 6286414 | 4/1987 | |
| JP | 62109528 | 5/1987 | |
| JP | 62120510 | 6/1987 | |
| JP | 62152421 | 7/1987 | |
| JP | 62152424 | 7/1987 | |
| JP | 63127310 A | 5/1988 | |
| JP | 63181727 | 7/1988 | |
| JP | 63241610 | 10/1988 | |
| JP | 03162814 A | 7/1991 | |
| JP | 03166074 | 7/1991 | |
| JP | 04260905 | 9/1992 | |
| JP | 0584200 | 4/1993 | |
| JP | 0584210 | 4/1993 | |
| JP | 05084200 | 4/1993 | |
| JP | 05189041 | 7/1993 | |
| JP | 05224745 | 9/1993 | |
| JP | 05228090 | 9/1993 | |
| JP | 064133 | 1/1994 | |
| JP | 0683442 A | 3/1994 | |
| JP | 06125861 | 5/1994 | |
| JP | 06144215 | 5/1994 | |
| JP | 06179145 | 6/1994 | |
| JP | 075922 | 1/1995 | |
| JP | 0759695 | 3/1995 | |
| JP | 0732752 B2 | 4/1995 | |
| JP | 07129239 A | 5/1995 | |
| JP | 07281742 | 10/1995 | |
| JP | 08089455 | 4/1996 | |
| JP | 08326025 | 12/1996 | |
| JP | 0944240 | 2/1997 | |
| JP | 09150741 | 6/1997 | |
| JP | 09185410 | 7/1997 | |
| JP | 11267074 | 10/1999 | |
| JP | 2001022443 | 1/2001 | |
| JP | 2001187009 | 7/2001 | |
| JP | 2002182742 A | 6/2002 | |
| JP | 2002287824 A | 10/2002 | |
| JP | 2002355204 | 12/2002 | |
| JP | 2002366228 | 12/2002 | |

(56) References Cited

FOREIGN PATENT DOCUMENTS

| | | |
|---|---|---|
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005124753 A | 5/2005 |
| JP | 2005141636 A | 6/2005 |
| JP | 2005314116 A | 11/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009500741 A | 1/2009 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2010534825 A | 11/2010 |
| JP | 2011045694 | 3/2011 |
| JP | 2011253361 A | 12/2011 |
| JP | 2012216051 A | 11/2012 |
| JP | 2013041506 A | 2/2013 |
| JP | 2013089256 A | 5/2013 |
| JP | 2013247986 A | 12/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 03026474 A2 | 4/2003 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2014151501 A1 | 9/2014 |
| WO | 2015016580 | 2/2015 |

OTHER PUBLICATIONS

International Search Report and Written Opinion for International Application No. PCT/EP2015/070140, dated May 27, 2016, 11 pages.

European Communication Pursuant to Article 94(3) for European Application No. 13817911.4, dated Jan. 15, 2018, 8 pages.

Non Final Office Action for U.S. Appl. No. 15/102,017, dated Feb. 16, 2018, 12 pages.

Non Final Office Action for U.S. Appl. No. 15/101,212, dated May 17, 2017, 8 pages.

Japanese Office Action forApplication for Japanese Application No. 2015-528969, dated Apr. 7, 2017 with translation, 4 pages.

Final Office Action for U.S. Appl. No. 14/409,291, dated Jun. 6, 2017, 21 pages.

Chinese Office Action for Chinese Application No. 201380075503.9, dated Nov. 8, 2017 with translation, 16 pages.

European Communication Pursuant to Article 94(3) for European Application No. 16176479.0, dated Nov. 27, 2017, 6 pages.

Non Final Office Action for U.S. Appl. No. 15/101,515, dated Apr. 18, 2018, 14 pages.

Notice of Allowance for U.S. Appl. No. 15/101,212, dated Apr. 11, 2018, 9 pages.

Final Office Action for U.S. Appl. No. 14/764,106, dated Mar. 28, 2018, 8 pages.

Final Office Action for U.S. Appl. No. 15/100,667, dated Mar. 27, 2018, 23 pages.

Notification of Reasons for Refusal for Japanese Application No. 2017-501374, dated Mar. 6, 2018 with translation, 8 pages.

Chinese Office Action for Chinese Application No. 201380081535.X, dated Mar. 26, 2018 with translation, 18 pages.

Chinese Office Action for Chinese Application No. 201380081103.9, dated Feb. 27, 2018 with translation, 19 pages.

"SM51 Series Opposed Mode Sensors, DC sensors with metal housings: SM51EB/RB, SM51EB6/RB6", Banner Engineering Corporation, pp. 1-24.

Andersson, et al., "ISR: An Intelligent Service Robot", Centre for Autonomous Systems, Royal Institute of Technology, S-100 44 Stockholm, Sweden, pp. 1-24.

Berlin, et al. "Development of a Multipurpose Mobile Robot for Concrete Surface Processing", A Status Report, Feb. 1992, Sweden, pp. 1-10.

Borenstein, et al. "Real-Time Obstacle Avoidance for Fast Mobile Robots", IEEE, Jan. 6, 1996, pp. 1-18.

Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376, Sep. 1995, pp. 1-9.

Caselli, et al. "Mobile Robot Navigation in Enclosed Large-Scale Space", Italy and U.S.A., pp. 1-5.

Cassens, et al. "Finishing and Maintaining Wood Floors", Wood Finishing, North Central Regional Extension Publication #136, pp. 1-8.

Chinese Office Action for Chinese Application No. 20130075510.9, dated Feb. 6, 2017 with translation, 14pages.

Chinese Office Action for Chinese Application No. 201380075503.9, dated Feb. 13, 2017 with translation, 18 pages.

Chung etal.,"Path Planning for a Mobile Robot With Grid Type World Model", Proceedings of the 1992 IEEE/RSJ International Conference on Intelligent Robots and Systems, Jul. 7-10, 1992, pp. 439-444.

Collins, et al. "Cerebellar Control of a Line Following Robot", Computer Science and Electrical Engineering Department, University of Queensland, St.Lucia, Queensland, 4072 A, pp. 1-6.

Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.

Everett, Sensors for Mobile Robots Theory and Application, A.K. Peters, 1995, Chapters 1 and 3, 70pages.

Everett, Sensors for Mobile Robots Theory and Application, A.K. Peters, Ltd., 1995, Chapters 15 and 16, 59pages.

Everett, Sensors for Mobile Robots Theory and Application, A.K. Peters, Ltd., 1995, Chapters 6, 7 and 10, 79pages.

Everett, Sensors for Mobile Robots Theory and Application, A.K. Peters, Ltd., 1995, Chapters, 4a nd 5, 68pages.

(56) References Cited

OTHER PUBLICATIONS

Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Search Report and Written Opinion of the International Searching Authority for International Application No. PCT/EP2014/077549, dated Jul. 27, 2015, 9 pages.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Applicaion No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 12, 2014, 4 pages.
International Search Report for International Application No. PCT/EP2013/067500 dated Dec. 10, 2013, 4pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana, CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Notice of Allowance for U.S. Appl. No. 14/409,291, dated Jun. 16, 2016, 13 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.

(56) References Cited

OTHER PUBLICATIONS

Written Opinion for International Application No. PCT/EP2013/067500 dated Dec. 10, 2013, 7pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notice of Reasons for Rejection for Japanese Application No. 2016-526947, dated Sep. 21, 2017 with translation, 8 pages.
Notice of Allowance for U.S. Appl. No. 15/102,015, dated Dec. 11, 2017, 8 pages.
Notice of Allowance for U.S. Appl. No. 14/409,291, dated Sep. 18, 2017, 8 pages.
Notice of Reasons for Rejection for Japanese Application No. 2016-526764, dated Aug. 25, 2017 with translation, 6 pages.
Notification of Reasons for Rejection for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Final Office Action for U.S. Appl. No. 15/102,017, dated Jun. 14, 2018, 12 pages.
Non Final Office Action for U.S. Appl. No. 15/101,235, dated Jun. 14, 2018, 11 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Notice of Allowance for U.S. Appl. No. 15/101,257, dated Jul. 6, 2017, 9 pages.
International Search Report and Written Opinion of the International Searching Authority for International Application No. PCT/EP2015/058377, dated Aug. 10, 2016, 15 pages.
Non Final Office Action for U.S. Appl. No. 15/102,015, dated Aug. 17, 2017, 13 pages.
Final Office Action for U.S. Appl. No. 15/101,235, dated Jan. 11, 2019, 12 pages.
Notification of Reasons for Refusal of Japanese Application No. 2016-568949, dated Oct. 9, 2018 with translation, 6 pages.
Extended European Search Report for European Application No. 18157403.9, dated Nov. 14, 2018, 12 pages.
Report of Reconsideration by Examiner before Appeal for Japanese Application No. 2016-526875, dated Oct. 24, 2018, 2 pages.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
Notice of Allowance for U.S. Appl. No. 14/784,106, dated Oct. 11, 2018 7 pages.
Non Final Office Action for U.S. Appl. No. 15/321,333, dated Oct. 24, 2018, 10 pages.
Position_Definition of Position by Merriam-Webster.pdf (Position I Definition of Position by Merriam-Webster, Oct. 16, 2018, Merriam-Webster, https://www.merriam-webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Non Final Office Action for U.S. Appl. No. 15/504,066, dated Nov. 5, 2018, 18 pages.
International Search Report and Written Opinion for International Application No. PCT/EP2016/055547, dated Jan. 2, 2017, 10 pages.
Notice of Allowance for U.S. Appl. No. 15/100,667, dated Aug. 6, 2018, 10 pages.
Non Final Office Action for U.S. Appl. No. 14/784,110, dated Aug. 16, 2018, 13 pages.
Chinese Office Action for Chinese Application No. 201380081537.9, dated Jun. 4, 2018 with translation, 15 pages.
Non Final Office Action for U.S. Appl. No. 15/102,017, dated Jan. 22, 2019, 15 pages.
Final Office Action for U.S. Appl. No. 15/504,071, dated Mar. 5, 2019, 20 pages.
Final Office Action for U.S. Appl. No. 15/504,066, dated Mar. 21, 2019, 18 pages.
Chinese Office Action for Chinese Application No. 201380081103.9, dated Jun. 6, 2019 with translation, 10 pages.
Non Final Office Action for U.S. Appl. No. 15/534,591, dated Aug. 9, 2019, 11 pages.
Non Final Office Action for U.S. Appl. No. 15/504,071, dated Aug. 8, 2019, 23 pages.
Notice of Allowance for U.S. Appl. No. 15/504,066, dated Aug. 9, 2019, 8 pages.

* cited by examiner

ADAPTIVE SPEED CONTROL OF ROTATING SIDE BRUSH

This application is a U.S. National Phase application of PCT International Application No. PCT/EP2013/077385, filed Dec. 19, 2013, which is incorporated by reference herein.

TECHNICAL FIELD

The invention relates to a method of controlling rotating side brushes of a robotic cleaning device and a robotic cleaning device performing the method.

BACKGROUND

Robotic vacuum cleaners are know in the art, which are equipped with drive means in the form of motors for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a space in the form of e.g. a room.

Traditionally, robotic vacuum cleaners have been arranged with circular-shaped main bodies. Such a robot having co-axial drive wheels at the centre of its body has the advantage that it is easy to control and cannot get stuck since it always can rotate 180° and go back the same way it came. However, the circular-shaped main body makes them unsuitable for cleaning corners or edges where a floor meets a wall since these circular vacuum cleaners due to their shape cannot move into a corner or close enough to a wall, or other objects around which cleaning is required such as e.g. chair legs. An example of a robotic vacuum cleaner aiming at solving this problem is disclosed in WO 03/024292, the main body of which at its rear end is circular-shaped, whereas the front end of the main body is substantially rectangular. This is an improvement over the traditional circular-shaped robotic vacuum cleaners in terms of reaching into corners. Further, sweeping brushes are arranged at a bottom side of the main body and disposed such that they are associated with front corner regions of the rectangular-shaped main body front end.

SUMMARY

An object of the present invention is to provide an improved method of controlling rotating side brushes of a robotic cleaning device and a robotic cleaning device performing the improved method.

This object is attained in a first aspect of the present invention by a method of controlling rotation of at least one rotating side brush of a robotic cleaning device. The method comprises controlling movement of the robotic cleaning device across a surface to be cleaned, registering a speed with which the robotic cleaning device moves across the surface, and controlling rotational speed of the at least one side brush on the basis of the speed of movement of the robotic cleaning device.

This object is attained in a second aspect of the present invention by a robotic cleaning device comprising a main body, at least one driving wheel arranged to move the robotic cleaning device across a surface to be cleaned, driving means arranged to control the at least one driving wheel to rotate in order to move the robotic cleaning device across the surface, and a controller arranged to control the driving means to move the robotic cleaning device across the surface. Further, the robotic cleaning device comprises an opening in a bottom side of the main body via which debris is removed from the surface to be cleaned and a rotating side brush arranged adjacent to the opening. The controller is arranged to register a speed with which the robotic cleaning device moves across the surface, and further to control rotational speed of the rotating side brush on the basis of the registered speed of movement of the robotic cleaning device.

Advantageously, the rotating side brush is used to collect dirt and debris located at, or even beyond, a periphery of the main body of the robotic cleaning device, or any debris out of reach of the opening via which a suction fan typically causes an air flow for transporting the debris to a dust chamber, such that the debris ends up under the main body and thus can be transported to the dust chamber of the robotic cleaning device via the opening in the main body. Further, the effectiveness of the rotating side brush can advantageously be improved by controlling its rotational speed on the basis of the speed with which the robotic cleaning device moves across the surface to be cleaned; different cleaning situations require different modes of operation of the rotating side brush.

In an embodiment of the present invention, the rotating side brush is arranged at a periphery of the main body. Advantageously, by positioning the rotating side brush at the periphery of the main body, the robotic cleaning device is capable of reaching into and cleaning corners and other areas where robotic cleaning device cannot reach.

In another embodiment of the present invention, the controller (being e.g. a processing unit such as a microprocessor) is arranged to decrease the rotational speed of the rotating side brush when the registered speed of movement of the robotic cleaning device decreases across the surface to be cleaned. Conversely, the controller increases the rotational speed of the rotating side brush when the speed of movement of the robotic cleaning device increases. For instance, if the robotic cleaning device moves over an open surface or a surface with little debris, the cleaning device is controlled to move at a relatively high speed, wherein the rotational speed of the rotating side brush also advantageously is controlled to attain a relatively high speed. In contrast, if the robotic cleaning device moves over a surface crowded by e.g. furniture, toys and other objects, or a surface with much debris, the cleaning device is controlled to move at a relatively low speed, wherein the rotational speed of the rotating side brush also advantageously is controlled to be lowered.

Thus, in still another embodiment of the present invention, the controller is arranged to control the rotation of the rotating side brush such that circumferential rotational speed of the side brush is relative to the speed of movement of the robotic cleaning device over the surface to be cleaned. In yet another embodiment of the present invention, the circumferential rotational speed of the rotating side brush is controlled to be equal to or higher than the speed of movement of the robotic cleaning device over the surface to be cleaned. This is advantageous since the speed of movement of the robot otherwise is higher than a speed with which the debris is sweeped by the rotating side brush, consequently risking that the debris will be left behind by the robotic cleaning device and thus not be removed from the surface to be cleaned.

In a further embodiment of the present invention, the controller is arranged to control the rotation of the rotating side brush such that the speed of rotation does not fall below a lower threshold value regardless of the speed of movement of the robotic cleaning device over the surface to be cleaned. Advantageously, if the speed of movement of the robotic cleaning device is low, perhaps even zero, the rotational speed of the side brush is still controlled to exceed a lower threshold value in order to avoid bringing the rotating side brush to a standstill. It should be noted that the speed of the robotic cleaning device at least momentarily will fall to zero it the cleaning device suddenly is controlled to move in a 180° direction. With this embodiment, the rotational speed of the side brush will advantageously still exceed a lower threshold value.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

The invention relates to robotic cleaning devices, or in other words, to automatic, self-propelled machines for cleaning a surface, e.g. a robotic vacuum cleaner or a robotic sweeper. The robotic cleaning device according to the invention can be mains-operated and have a cord, be battery-operated or use any other kind of suitable energy source, for example solar energy.

Figure 1:
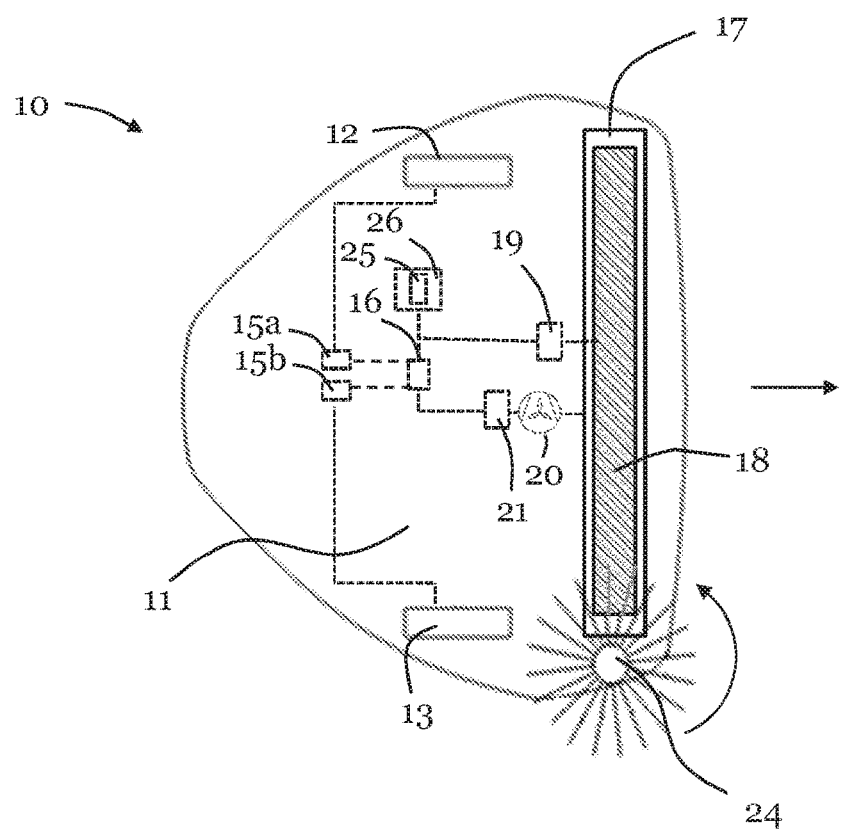
FIG. 1 shows a bottom view of a robotic cleaning device according to embodiments of the present invention.

FIG. 1 shows a robotic cleaning device 10 according to embodiments of the present invention in a bottom view, i.e. the bottom side of the robotic cleaning device is shown. The arrow indicates the forward direction of the robotic cleaning device. The robotic cleaning device 10 comprises a main body 11 housing components such as a propulsion system comprising driving means in the form of two wheel motors 15a, 15b for enabling movement of the driving wheels 12, 13 such that the cleaning device can be moved over a surface to be cleaned. Each wheel motor 15a, 15b is capable of controlling the driving wheels 12, 13 to rotate independently of each other in order to move the robotic cleaning device 10 across the surface to be cleaned. A number of different driving wheel arrangements can be envisaged. For instance, robotic cleaning devices exist where the driving wheels 12, 13 are coaxially arranged along a drive shaft (not shown). As an alternative, a track propulsion system may be used or even a hovercraft propulsion system. Further, different driving motor arrangements are possible; for instance one driving wheel and one driving motor, two driving wheels and one driving motor, or even three wheels with three separate driving motors for independent control, etc. It should be noted that the robotic cleaning device may have any appropriate shape, such as a device having a more traditional circular-shaped main body, or a triangular-shaped main body.

A controller 16 such as a microprocessor controls the wheel motors 15a, 15b to rotate the driving wheels 12, 13 as required in view of information received from an obstacle detecting device (not shown) for detecting obstacles in the form of walls, floor lamps, table legs, around which the robotic cleaning device must navigate.

The obstacle detecting device may be embodied in the form of infrared (IR) sensors and/or sonar sensors, a microwave radar, a 3D sensor system registering its surroundings, implemented by means of e.g. a 3D camera, a camera in combination with lasers, a laser scanner, etc., for detecting obstacles and communicating information about any detected obstacle to the microprocessor 16. The microprocessor 16 communicates with the wheel motors 15a, 15b to control movement of the wheels 12, 13 in accordance with information provided by the obstacle detecting device such that the robotic cleaning device 10 can move as desired across the surface to be cleaned.

Further, the main body 11 is arranged with a cleaning member for removing debris and dust from the surface to be cleaned. This is in an embodiment of the present invention implemented by means of a suction fan 20 creating an air flow for transporting debris to a dust chamber or cyclone arrangement housed in the main body via an opening 17 in the bottom side of the main body 11. In a further embodiment, the cleaning member further comprises a rotatable brush roll 18 arranged along a horizontal axis in the opening 17 to enhance the dust and debris collecting properties of the cleaning device 10. In order to rotate the brush roll 17, a brush roll motor 19 is operatively coupled to the brush roll to control its rotation in line with instructions received from the controller 16. The suction fan 20 is driven by a fan motor 21 communicatively connected to the controller 16 from which the fan motor 21 receives instructions for controlling the suction fan 20.

With further reference to FIG. 1, the processing unit 16 embodied in the form of one or more microprocessors is arranged to execute a computer program 25 downloaded to a suitable storage medium 26 associated with the microprocessor, such as a Random Access Memory (RAM), a Flash memory or a hard disk drive. The processing unit 16 is arranged to carry out a method according to embodiments of the present invention when the appropriate computer program 25 comprising computer-executable instructions is downloaded to the storage medium 26 and executed by the processing unit 16. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a network. The processing unit 16 may alternatively be embodied in the form of a digital signal processor (DSP), an application specific integrated circuit (ASIC), a field-programmable gate array (FPGA), a complex programmable logic device (CPLD), etc.

The main body 11 is further arranged with a rotating side brush 24 adjacent to the opening 17, the rotation of which could be controlled by the drive motors 15a, 15b, the brush roll motor 19, or alternatively a separate side brush motor (not shown). Advantageously, the rotating side brush 24 sweeps debris and dust such from the surface to be cleaned such that the debris ends up under the main body 10 at the opening 17 and thus can be transported to a dust chamber of the robotic cleaning device. Further advantageous is that the reach of the robotic cleaning device 10 will be improved, and e.g. corners and areas where a floor meets a wall are much more effectively cleaned. As is illustrated in FIG. 1, the rotating side brush 24 rotates in a direction such that it sweeps debris towards the opening 17 such that the suction fan 20 can transport the debris to a dust chamber.

Figure 2:
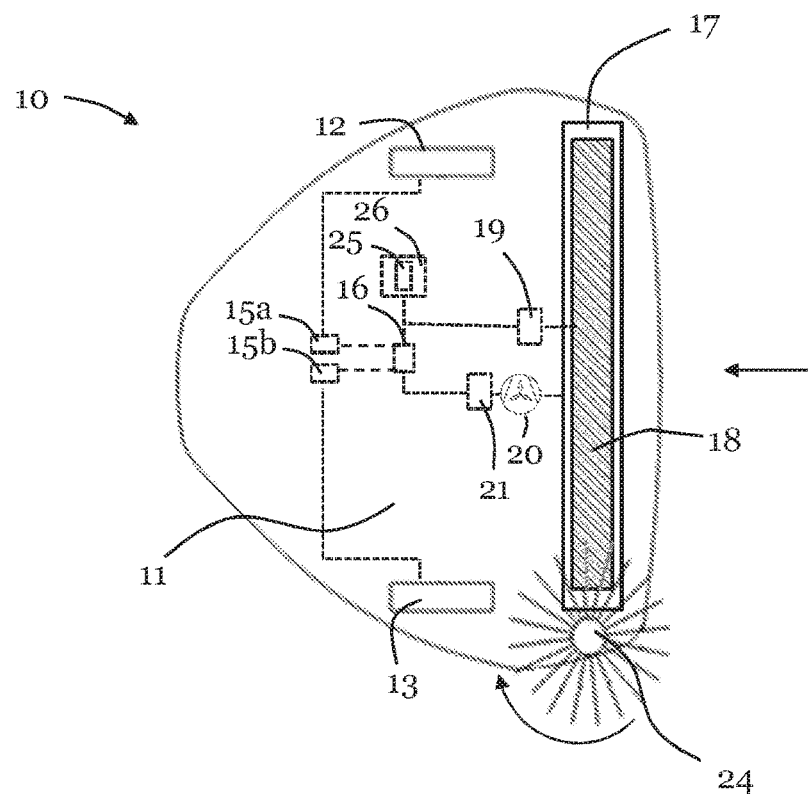
FIG. 2 shows the robotic cleaning device of FIG. 1 moving in a reverse direction.

Thus, with reference to an embodiment of the present invention further illustrated with reference to FIG. 2 as well as FIG. 1, the controller 16 is arranged to control the direction of rotation of the rotating side brush 24 such that a point 27 on a periphery of the side brush being distal with respect to the opening 17 moves in a same direction as the direction of movement of the robotic cleaning device. Analogously, a point (not shown) on a periphery of the side brush 24 being proximal with respect to the opening 17 will move in an opposite direction as the direction of movement of the robotic cleaning device. In FIG. 1, when the robotic cleaning device 10 moves in a forward direction, the rotating side brush 24 is controlled to sweep debris towards the opening 17, i.e. the distal point 27 of the rotating side brush 24 moves in the same direction as the direction of movement of the robotic cleaning device 10. With reference to FIG. 2, if the robotic cleaning device 10 suddenly would be controlled to move in a reverse direction, the controller 16 will still control the rotating side brush 24 to sweep debris towards the opening 17, i.e. the distal point 27 of the rotating side brush 24 is changed to again move in the same direction as the direction of movement of the robotic cleaning device 10.

Figure 3:
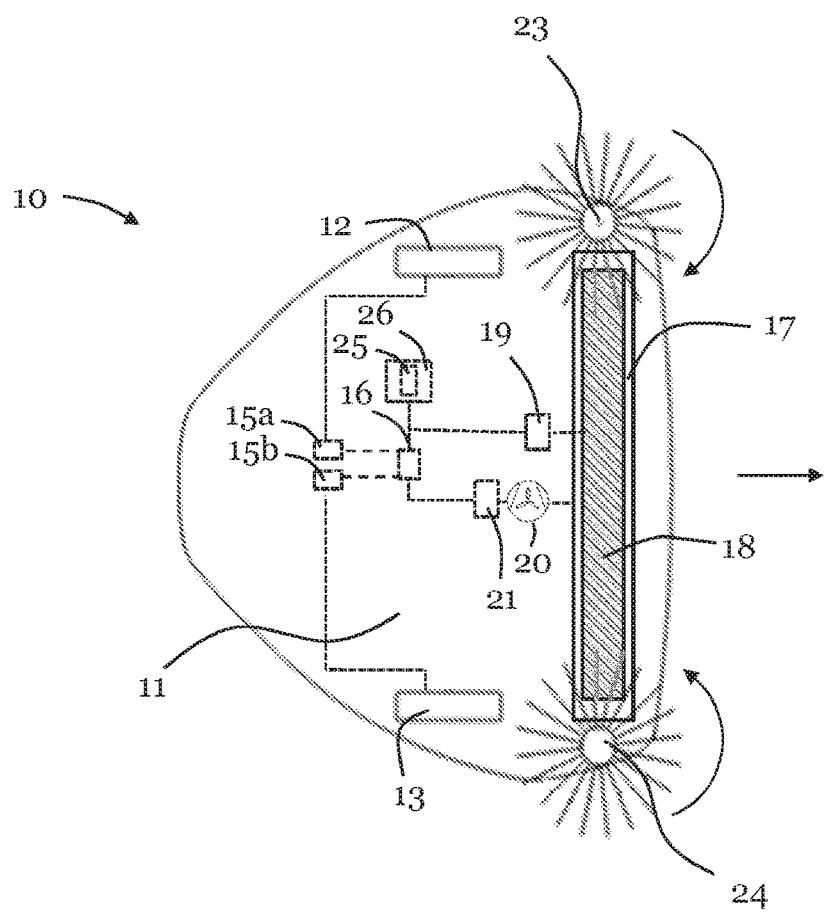
FIG. 3 shows a bottom view of a robotic cleaning device according to embodiments of the present invention being equipped with two rotating side brushes.

FIG. 3 illustrates a further embodiment of the present invention, where the robotic cleaning device 10 comprises two rotating side brushes 23, 24 arranged laterally on each side of, and adjacent to, the opening 17.

As previously has been discussed, the effectiveness of the rotating side brush(es) 23, 24 can advantageously be improved by controlling its rotational speed on the basis of the speed with which the robotic cleaning device 10 moves across the surface to be cleaned, since different cleaning situations require different modes of operation of the rotating side brush 24.

Figure 4A:
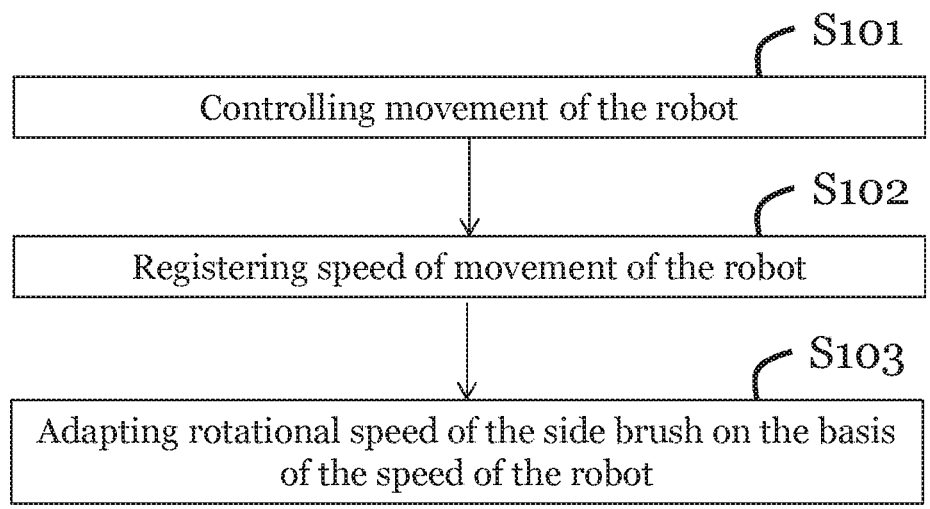
FIG. 4a illustrates a flow chart of an embodiment of a method of controlling rotation speed of a side brush of a robotic cleaning device according to the present invention.

FIG. 4a illustrates a flow chart of an embodiment of the method of controlling rotation of at least one rotating side brush of a robotic cleaning device according to the present invention. Reference is further made to FIG. 1 for elements of the robotic cleaning device of the present invention. In a first step 101, the controller 16 controls movement of the robotic cleaning device 10 in accordance with navigation information, by sending control signals to the drive motors 15a, 15b which causes the wheels 12, 13 to rotate and the robotic cleaning device 10 to move accordingly. The controller 16 consequently controls the speed with which the robotic cleaning device 10 moves across the surface. In a second step S102, the controller 16 registers the speed with which the robotic cleaning device moves. In step S103, the controller 16 controls the rotational speed of the side brush 24 on the basis of the speed of movement of the robotic cleaning device 10.

Figure 4B:
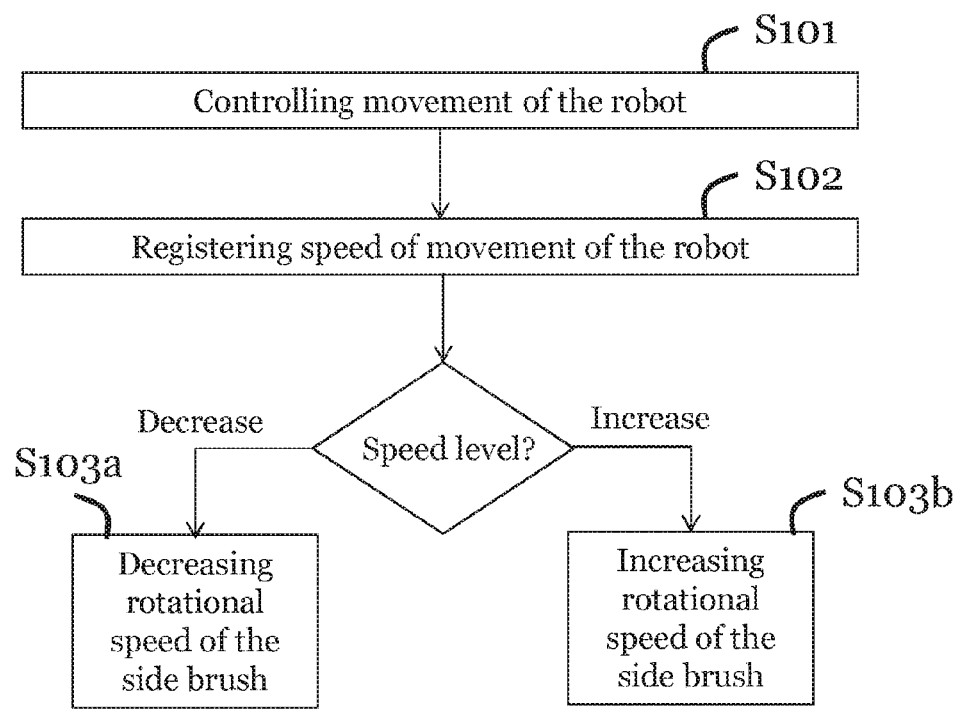
FIG. 4b illustrates a flow chart of another embodiment of a method of controlling rotation speed of a side brush of a robotic cleaning device according to the present invention.

For instance, in a more detailed embodiment of the present invention, a flowchart of which is illustrated in FIG. 4b, the controller 16 controls movement of the robotic cleaning device 10 in step S101 in accordance with navigation information provided to the controller e.g. by a predetermined cleaning program selected by a user. As the robotic cleaning device 10 moves across the surface, the controller 16 measures the speed of movement of the robotic cleaning device, either by e.g. a speed indicator or by recording speed of rotation of the wheels 12, 13. It is further envisaged that the controller 16 calculates the speed of movement on the basis of the control signals sent to the drive motors 15a, 15b. Thus, the speed of movement of the robotic cleaning device 10 is not necessarily measured by a sensor such as a speed indicator, but could alternatively be calculated or estimated by the controller 16, using properties of the control signals (e.g. amplitude and/or duty cycle of pulse-width modulation control signals, etc.) in combination with a known diameter of the wheels 12, 13. In response to the registered speed of movement, the controller generates and transfers a control signal to the rotating side brush 24 for controlling the speed of rotation of the side brush 24. In this particular embodiment, as long as the speed of movement of the robotic cleaning device 10 is constant, the controller 16 will maintain the rotational speed of the side brush 24. However, if the speed of movement of the robotic cleaning device decreases, the controller 16 is arranged to decrease the rotational speed of the rotating side brush 24 in step S103a by configuring the control signal accordingly. Conversely, the controller 16 increases the rotational speed of the rotating side brush 24 in step S103b when the speed of movement of the robotic cleaning device 10 increases. For instance, if the robotic cleaning device 10 moves over an open surface or a surface with little debris, it is controlled to move at a relatively high speed, wherein the rotational speed of the rotating side brush 24 also advantageously is controlled to attain a relatively high speed. In contrast, if the robotic cleaning device 10 moves over a surface crowded by e.g. furniture, toys and other objects, or a surface with much debris, the robotic cleaning device 10 is controlled to move at a relatively low speed, wherein the rotational speed of the rotating side brush 24 also advantageously is controlled to be lowered.

In still another embodiment of the present invention, the controller 16 is arranged to control the rotation of the rotating side brush 24 such that the circumferential rotational speed of the side brush 24 is relative to the speed of movement of the robotic cleaning device 10 over the surface to be cleaned. Hence:

$$v_m = k \times v_r, \text{ where}$$

$v_m$ is the speed of the robotic cleaning device, k is a proportionality factor, and $v_r$ is the rotational speed of the rotating side brush.

Circumferential rotational speed is defined as:

$v_r = 2\pi \times r \times f$, where r is the radius of the rotating side brush, and
f is the frequency with which the brush rotates.

In yet another embodiment of the present invention, the circumferential rotational speed of the rotating side brush 24 is controlled to be equal to or higher than the speed of movement of the robotic cleaning device 10 over the surface to be cleaned. Hence, in an example, assuming that robotic cleaning device 10 moves with a speed of $v_m = 1$ m/s and the radius of the rotating side brush is r=0.03 m, the rotational speed of the rotating side brush would become:

$f = 1/0.06\pi = 5.3$ revolutions/s.

In a further embodiment of the present invention, to prevent the rotating side brush 24 from being brought into standstill in case the robotic cleaning device 10 moves slowly or even stops, the controller 16 will control the rotation of the rotating side brush 24 such that the speed of rotation does not fall below a lower threshold value regardless of the speed of movement of the robotic cleaning device 10 over the surface to be cleaned. For instance, the side brush 24 could be arranged (given that the robotic cleaning device 10 is in a cleaning mode) to always rotate with at least 1 revolution/s.

Figure 5:
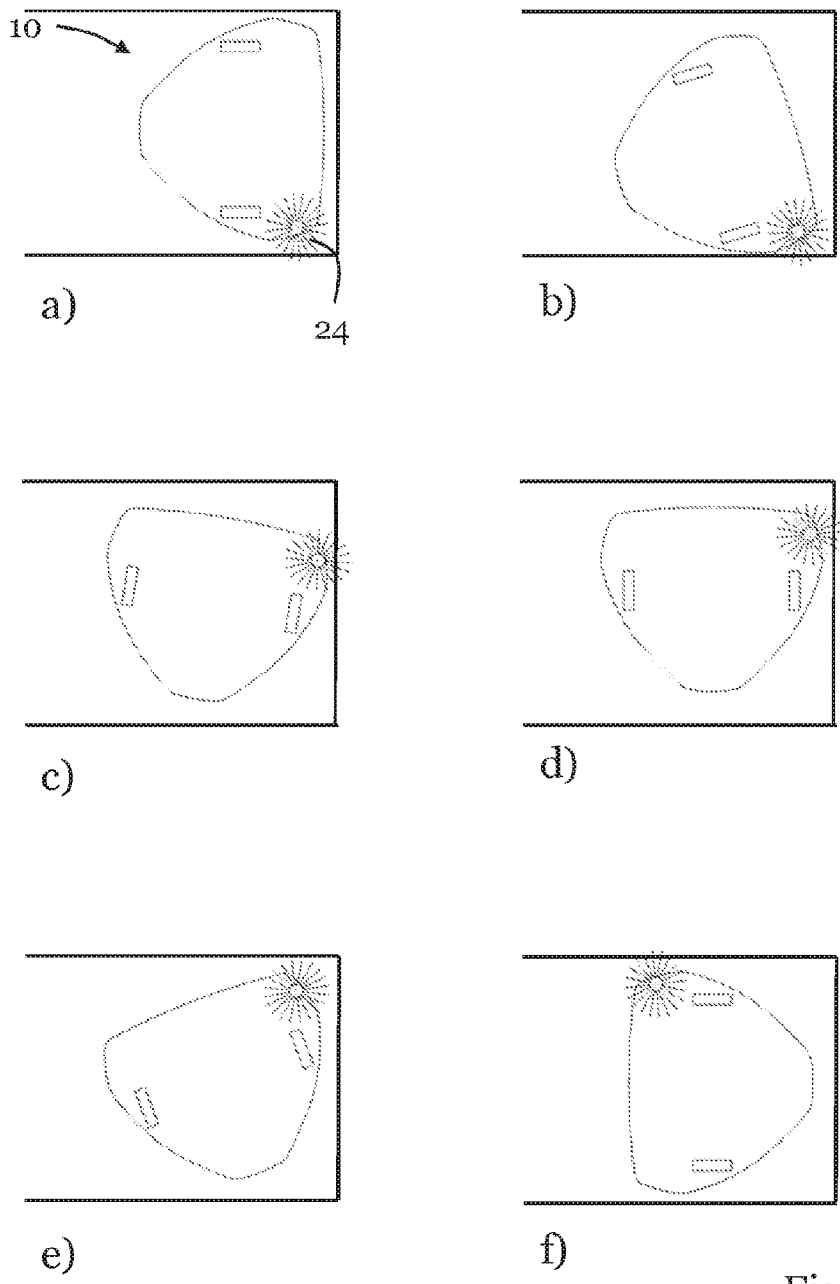
FIG. 5 illustrates a sequence a-f of movements of the robotic cleaning device of FIG. 1 navigating into and out of two corners in a narrow corridor in a bottom view.

FIG. 5 illustrates a sequence a-f of movements of the robotic cleaning device 10 arranged with a rotatable side brush 24 navigating into and out of two corners in a narrow corridor in a bottom view;

In FIG. 5*a*, the robotic cleaning device 10 navigates into a first corner via a wall leading into the corner. The front end wall of the main body faces the wall leading out of the corner while the left side wall (as seen from the top of the main body) faces the wall leading into of the corner. As can be seen, the side brush 24 reaches any debris located at the very walls and in the corner.

In FIG. 5*b*, the robotic cleaning device 10 is rotated such that the curved left side wall follows the wall leading into the first corner while the front end wall at one of its outer ends follows the wall leading out of the corner, which rotation continues in FIG. 5*c*. Is should be noted that the right side wall and the left side wall could be flat, but that a curved shape follows the wall in a smoother manner. The side brush 24 advantageously reaches all the way into the corner. FIG. 5*d* shows the robotic cleaning device approaching the second corner, while FIG. 5*e* shows the side brush 24 reaching into the second corner. Finally, in FIG. 5*f*, the cleaning device has made a 90-degree turn in the second corner and is ready to pursue the wall leading out of the corner with the side brush 24 flush contacting the wall to be pursued or to make a 90-degree turn back into the second corner.

Thus, as can be deduced from FIG. 5, the robotic cleaning device 10 according to the present invention advantageously navigates corners and narrow corridors while still navigating very close to the walls leading into and out of the corner, thereby facilitating removal of debris from the floor at a very close range from the walls in an effective manner by controlling the rotation of the side brush 24 as has been set out in the above.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic cleaning device comprising:
   a main body;
   a propulsion system configured to move the robotic cleaning device across a surface to be cleaned;
   a controller configured to control the propulsion system to move the robotic cleaning device across the surface to be cleaned;
   an opening in a bottom side of the main body via which debris is removed from the surface to be cleaned; and
   at least one rotating side brush arranged adjacent to the opening and arranged to contact the surface to be cleaned, wherein the at least one rotating side brush is configured to rotate in a direction parallel to the surface to be cleaned as the propulsion system moves the robotic cleaning device across the surface to be cleaned, and
   wherein the controller is configured to:
      register a speed with which the robotic cleaning device moves across the surface to be cleaned;
      control a rotational speed of the at least one rotating side brush on the basis of the registered speed of movement of the robotic cleaning device such that the rotational speed of the at least one rotating side brush decreases when the registered speed of movement of the robotic cleaning device decreases and such that the rotational speed of the at least one rotating side brush increases when the registered speed of movement of the robotic cleaning device increases; and
      control a rotational speed of the at least one rotating side brush on the basis of the registered speed of movement of the robotic cleaning device such that the rotational speed of the at least one rotating side brush, while the at least one rotating side brush is in contact with the surface to be cleaned, does not fall below a lower threshold value when the speed of movement of the robotic cleaning device over the surface to be cleaned is zero.

2. The robotic cleaning device of claim 1, wherein the at least one rotating side brush is arranged at a periphery of the main body.

3. The robotic cleaning device of claim 1, wherein the controller is configured to control the rotation of the at least one rotating side brush such that a circumferential rotational speed of the at least one rotating side brush is relative to the speed of movement of the robotic cleaning device over the surface to be cleaned.

4. The robotic cleaning device of claim 1, wherein the controller is configured to control the rotation of the at least one rotating side brush such that circumferential rotational speed of the at least one rotating side brush is substantially equal to or higher than the speed of movement of the robotic cleaning device over the surface to be cleaned.

5. The robotic cleaning device of claim 1, wherein the controller is configured to control direction of rotation of the at least one rotating side brush such that a point on a periphery of the side brush being distal with respect to the opening moves in a same direction as a direction of movement of the robotic cleaning device.

6. The robotic cleaning device of claim 1, wherein the at least one rotating side brush comprises:
   two rotating side brushes arranged laterally on each side of the opening.

7. A method of controlling rotation of at least one rotating side brush of a robotic cleaning device, the method comprising:

controlling movement of the robotic cleaning device across a surface to be cleaned, wherein the at least one rotating side brush is configured to rotate in a direction parallel to the surface to be cleaned as the movement of the robotic cleaning device across the surface to be cleaned is controlled;

registering a speed with which the robotic cleaning device moves across the surface to be cleaned; and controlling a rotational speed of the at least one side brush on the basis of the speed of movement of the robotic cleaning device, such that the rotational speed of the at least one rotating side brush decreases when the registered speed of movement of the robotic cleaning device decreases and such that the rotational speed of the at least one rotating side brush increases when the registered speed of movement of the robotic cleaning device increases; and controlling a rotational speed of the at least one rotating side brush on the basis of the registered speed of movement of the robotic cleaning device such that the rotational speed of the at least one rotating side brush, while the at least one rotating side brush is in contact with the surface to be cleaned, does not fall below threshold value when the speed of movement of the robotic cleaning device over the surface to be cleaned is zero.

8. The method of claim 7, wherein the controlling of the rotational speed of the at least one side brush comprises:

controlling the rotation of the at least one rotating side brush such that a circumferential rotational speed of the at least one rotating side brush is relative to the speed of movement of the robotic cleaning device over the surface to be cleaned.

9. The method of claim 7, wherein the controlling of the rotational speed of the at least one side brush comprises:

controlling the rotation of the at least one rotating side brush such that circumferential rotational speed of the at least one rotating side brush is equal to or higher than the speed of movement of the robotic cleaning device over the surface to be cleaned.

10. The method of claim 7, wherein the controlling of the rotational speed of the at least one side brush comprises:

controlling a direction of rotation of the at least one rotating side brush such that a point on a periphery of the side brush being distal with respect to an opening on the bottom of the robotic cleaning device moves in a same direction as a direction of movement of the robotic cleaning device.

11. A computer program product comprising a non-transitory computer readable medium, the non-transitory computer readable medium having a computer program for instructing a controller to perform steps according to claim 7.

* * * * *